(12) United States Patent  
Ding et al.

(10) Patent No.: US 7,542,225 B1  
(45) Date of Patent: Jun. 2, 2009

(54) DISK DRIVE IDLE MODE RESPONSIVE TO FLEX CIRCUIT CABLE BIAS CHANGES

(75) Inventors: Jianghong Ding, Lake Forest, CA (US); Zhi Wang, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 47 days.

(21) Appl. No.: 11/601,268

(22) Filed: Nov. 17, 2006

(51) Int. Cl.  
*G11B 21/02* (2006.01)  
*G11B 15/18* (2006.01)

(52) U.S. Cl. .......................................... 360/75; 360/69

(58) Field of Classification Search ........................ None  
See application file for complete search history.

(56) References Cited

U.S. PATENT DOCUMENTS

| | | | |
|---|---|---|---|
| 5,493,670 A * | 2/1996 | Douglis et al. .............. | 713/324 |
| 5,602,689 A | 2/1997 | Kadlec et al. | |
| 5,638,230 A | 6/1997 | Kadlec | |
| 5,646,797 A | 7/1997 | Kadlec et al. | |
| 5,675,450 A | 10/1997 | Kadlec | |
| 5,677,809 A | 10/1997 | Kadlec | |
| 5,680,272 A | 10/1997 | Kadlec et al. | |
| 5,682,273 A * | 10/1997 | Hetzler ........................ | 360/75 |
| 5,684,650 A | 11/1997 | Kadlec et al. | |
| 5,801,894 A * | 9/1998 | Boutaghou et al. ......... | 360/72.1 |
| 5,914,829 A | 6/1999 | Kadlec et al. | |
| 5,914,830 A | 6/1999 | Kadlec et al. | |
| 6,018,432 A * | 1/2000 | Ukani ......................... | 360/69 |
| 6,140,784 A | 10/2000 | Mazda | |
| 6,282,049 B1 * | 8/2001 | Cameron et al. ............. | 360/75 |
| 6,347,018 B1 | 2/2002 | Kadlec et al. | |
| 6,441,987 B1 * | 8/2002 | Lee ............................. | 360/78.04 |
| 6,600,622 B1 | 7/2003 | Smith | |
| 6,903,897 B1 | 6/2005 | Wang et al. | |

FOREIGN PATENT DOCUMENTS

| | | |
|---|---|---|
| EP | 00507907 B1 | 1/1991 |
| GB | 02273794 A | 6/1994 |
| GB | 02273809 A | 6/1994 |
| GB | 02273811 A | 6/1994 |
| WO | WO9205543 A1 | 4/1992 |

* cited by examiner

*Primary Examiner*—K. Wong  
(74) *Attorney, Agent, or Firm*—Blakely, Sokoloff, Taylor & Zafman (57) ABSTRACT

Disclosed is disk drive comprising an actuator including a head, a disk having a plurality of tracks, and a processor to control the movement of the actuator and the head relative to the disk. The processor is coupled to the actuator by a flex circuit cable. The processor commands the application of a pre-calibrated bias signal to the actuator during an idle mode to compensate for a bias force imparted by the flex circuit cable upon the actuator such that the head is maintained proximate a pre-determined track of the disk within a pre-determined idle zone of tracks and further determines if a back electromagnetic force (BEMF) reading associated with the actuator is greater than the threshold value, and if so, commands an exit out of the idle mode.

20 Claims, 6 Drawing Sheets

DISK DRIVE IDLE MODE RESPONSIVE TO FLEX CIRCUIT CABLE BIAS CHANGES

BACKGROUND OF THE INVENTION

1. Field of the Invention

The present invention relates to disk drives. More particularly, the present invention relates to a disk drive that is responsive to flex bias changes imparted by a flex circuit cable during an idle mode of the disk drive.

2. Description of the Prior Art and Related Information

Today, computers are used at work, at home, and everywhere in between. Computers advantageously enable communication, file sharing, the creation of electronic documents, the use of application specific software, and electronic commerce through Internet and other computer networks. Typically, each computer has a storage peripheral such as a disk drive (e.g. a hard disk drive).

A huge market exists for hard disk drives for mass-market computer devices such as desktop computers, and laptop computers, as well as for small form factor (SFF) disk drives for use in mobile computer devices (e.g. personal digital assistance (PDAs), cell-phones, digital cameras), etc.

Typically, the main assemblies of a hard disk drive are a head disk assembly (HDA) and a printed circuit board assembly (PCBA). The head disk assembly includes an enclosure including a base and a cover, at least one disk having at least one recording surface, a spindle motor for causing each disk to rotate, and an actuator arrangement. The PCBA generally includes circuitry for processing signals and controlling operations in the disk drive.

An actuator arrangement that is commonly used in hard disk drives is a rotary actuator arrangement included as part of a head stack assembly (HSA) that includes a collection of elements of the head disk assembly. The collection typically includes certain prefabricated subassemblies and certain components that are incorporated into the head disk assembly. For example, a prefabricated head stack assembly (HSA) may include a pivot bearing cartridge, a rotary actuator arrangement, and permanent magnets and an arrangement for supporting the magnets to produce a magnetic field for a voice coil motor (VCM).

The rotary actuator arrangement of the HSA may also include a coil forming another part of the voice coil motor, an actuator body having a bore through it, and a plurality of arms projecting parallel to each other and perpendicular to the access of the bore. The rotary actuator arrangement of the HSA may also include head gimbal assemblies (HGAs) that are supported by the arms. Each HGA includes a load beam and a head supported by the load beam. The head is positioned over a track on a recording surface of the disk to write or read data to or from the track, respectively. A flex circuit cable typically connects the processing circuitry of the PCBA to the rotary actuator of the HSA in order to deliver commands such as read and write commands, as well as idle mode and power-off commands.

Minimizing power consumption is always a critical design consideration for disk drives, and, especially, for small form factor (SFF) disk drives for use in mobile computing devices. Hence, to minimize power consumption and meet recovery time characteristics, disk drives often employ an idle mode that is entered into after a pre-determined time period when there are no commands received from the host device. Typically, in the idle mode, particular electronics of the disk drive, such as the pre-amplifier and read/write channel are powered down. In the idle mode, the head of the disk drive typically floats on the disk media at a pre-determined location by a constant VCM current being applied to the actuator to compensate for the bias force imparted by the flex circuit cable (hereinafter the flex bias).

Because there is always variation in flex bias from disk drive to disk drive, the VCM current to hold the head at a pre-determined location of the disk media is typically pre-calibrated for a disk drive.

Unfortunately, the flex bias associated with the flex circuit cable may change due to a number of factors, the most significant of which is temperature. This has become especially problematic with SFF disk drives for use in mobile devices that are exposed to a wide variety of different temperature changes due to their mobile nature.

For example, if the flex bias significantly increases in a negative direction (e.g. toward the outer diameter (OD) of the disk) then any margin toward the OD may be eaten up by the flex bias change and the head could be pushed toward the OD. Once the head reaches a certain point and passes the OD margin zone, the head may accelerate with increasing bias force along the OD direction and hit the loading ramp of the disk drive with excessive force. As a result, the head may be damaged and potential head-land-on-media failure may occur.

On the other hand, if the flex bias force increases in a positive direction (e.g. toward the inner diameter (ID) of the disk), the head may drift to the inner diameter (ID) and hit a crash-stop. This may cause problems in that the ID crash-stop presents a location where there is no servo-position information and therefore the disk drive may take a much longer time to recalibrate and re-enter active mode.

Thus, due to flex bias changes associated with the flex circuit cable, deleterious effects may result during disk drive idle mode such as the head hitting the OD loading ramp or the ID crash-stop.

SUMMARY OF THE INVENTION

The present invention relates to a disk drive idle mode that is responsive to flex bias changes associated with a flex circuit cable.

In one aspect, the invention may be regarded as a disk drive comprising an actuator including a head, a disk having a plurality of tracks, and a processor to control the movement of the actuator and the head relative to the disk. The processor is coupled to the actuator by a flex circuit cable. The processor commands the application of a pre-calibrated bias signal to the actuator during an idle mode to compensate for a bias force imparted by the flex circuit cable upon the actuator such that the head is maintained proximate a pre-determined track of the disk within a predetermined idle zone of tracks and determines if a back electromagnetic force (BEMF) reading associated with the actuator is greater than the threshold value, and if so, exits the idle mode.

In another aspect, the invention may be regarded as a method implemented in a disk drive to adaptively adjust for flex bias change in the flex circuit cable. The method comprises: applying a pre-calibrated bias signal to the actuator during an idle mode to compensate for a bias force imparted by the flex circuit cable upon the actuator such that the head is maintained proximate a pre-determined track of the disk within a pre-determined idle zone of tracks; and determining if a back electromagnetic force (BEMF) reading associated with the actuator is greater than a threshold value, and if so, exiting the idle mode.

In yet another aspect, a disk drive including a disk having a plurality of tracks and an actuator including a head in which the actuator is coupled to a processor of the disk drive by a flex circuit cable includes a processor-readable medium having stored thereon instructions, which, when executed by the processor causes the processor to perform operations. In particular, the processor performs the following operations: commanding the application of a pre-calibrated bias signal to the actuator during an idle mode to compensate for a bias force imparted by the flex circuit cable upon the actuator such that the head is maintained proximate a pre-determined track of the disk within a pre-determined idle zone of track; and determining if a back electromagnetic force (BEMF) reading associated with the actuator is greater than the threshold value, and if so, exiting the idle mode.

DETAILED DESCRIPTION

Figure 1:
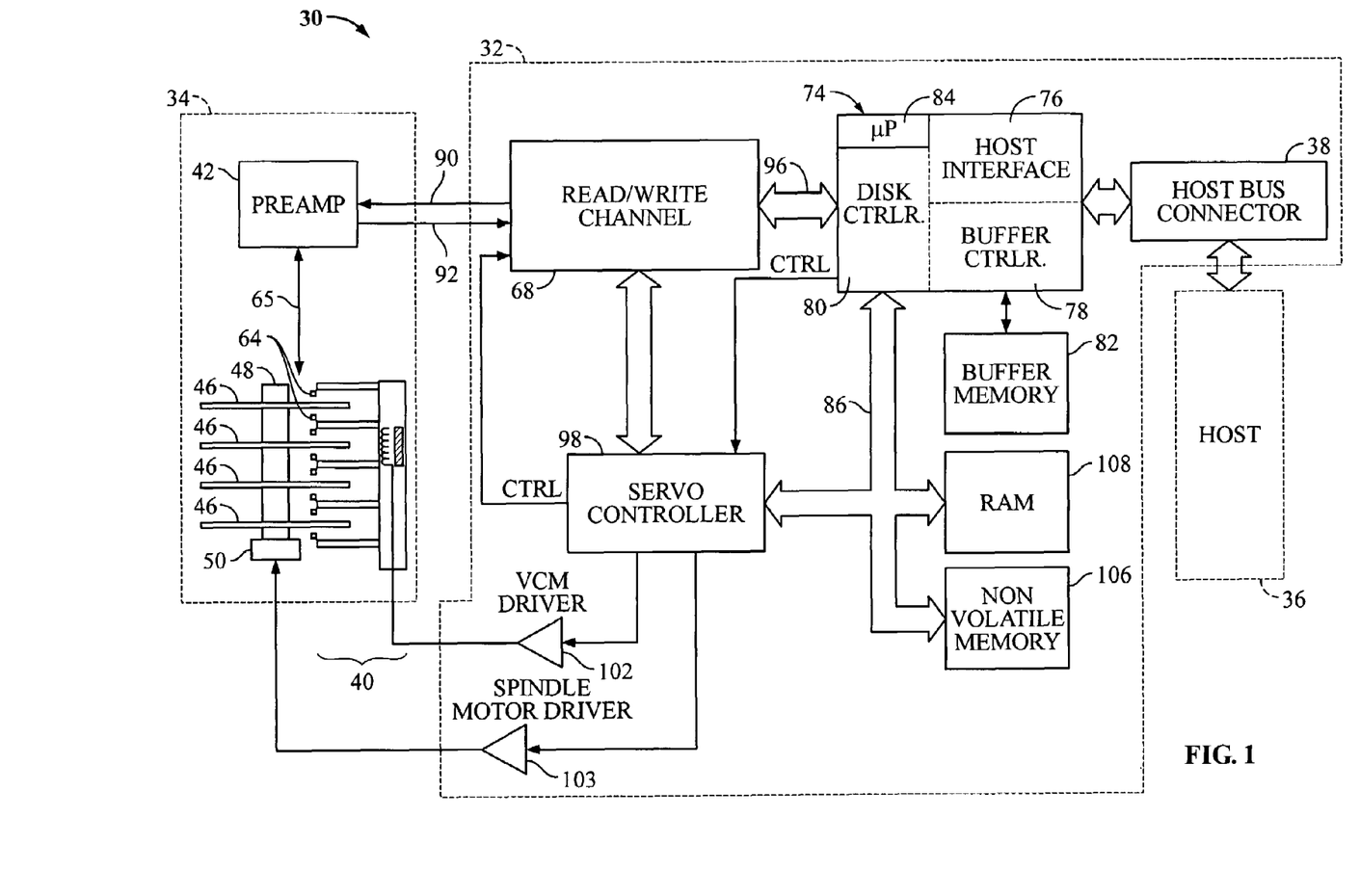
FIG. 1 shows a block diagram of a disk drive, such as a hard disk drive.

FIG. 1 shows a block diagram of a disk drive, such as a hard disk drive 30, in which embodiments of the invention may be practiced. The disk drive 30 may be connected to a host computer 36. Host computer 36 may be a desktop computer, a laptop computer, a mobile computing device (e.g., a personal digital assistant (PDA), camera, cell-phone, auto-navigation system, etc.), or any type of computing device utilizing a disk drive. Disk drive 30 comprises a Head/Disk Assembly (HDA) 34 and a controller printed circuit board assembly, PCBA 32. Disk drive 30 may be of any suitable form factor for its intended purpose, and, in one embodiment, may be a small form factor (SFF) disk drive.

The HDA 34 comprises: one or more disks 46 for data storage; a spindle motor 50 for rapidly spinning each disk 46 (four shown) on a spindle 48; and an actuator assembly 40 for moving a plurality of heads 64 in unison over each disk 46. The heads 64 are connected to a preamplifier 42 via a cable assembly 65 for reading and writing data on disks 46. Preamplifier 42 is connected to channel circuitry in controller PCBA 32 via read data line 92 and write data line 90. A flex circuit cable assembly may be utilized to connect the HDA to the PCBA, as will be described.

Controller PCBA 32 comprises a read/write channel 68, servo controller 98, host interface disk controller HIDC 74, voice coil motor driver VCM 102, spindle motor driver SMD 103, microprocessor 84, and several memory arrays—buffer or cache memory 82, RAM 108, and non-volatile memory 106.

Host initiated operations for reading and writing data in disk drive 30 are executed under control of microprocessor 84 connected to controllers and memory arrays via a bus 86. Program code executed by microprocessor 84 may be stored in non-volatile memory 106 and random access memory RAM 108. Program overlay code stored on reserved tracks of disks 46 may also be loaded into RAM 108 as required for execution.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Preferably, channel 68 employs PRML (partial response maximum likelihood) coding techniques.

HIDC 74 comprises a disk controller 80 for formatting and providing error detection and correction of disk data and other disk drive operations, a host interface controller 76 for responding to commands from host 36, a buffer controller 78 for storing data which is transferred between disks 46 and host 36, and microprocessor 84. Collectively the controllers in HIDC 74 provide automated functions which assist microprocessor 84 in controlling disk drive operations.

A servo controller 98 provides an interface between microprocessor 84 and actuator assembly 40 and spindle motor 50. Microprocessor 84 commands logic in servo controller 98 to position actuator assembly 40 using a VCM driver 102 and to precisely control the rotation of spindle motor 50 with a spindle motor driver 103. Disk drive 30 may employ a sampled servo system in which equally spaced servo wedge sectors are recorded on each track of each disk 46. Data sectors are recorded in the intervals between servo sectors on each track. Servo sectors are sampled at regular intervals to provide servo position information to microprocessor 84. Servo sectors are received by channel 68, and are processed by servo controller 98 to provide position information to microprocessor 84 via bus 86.

Figure 2:
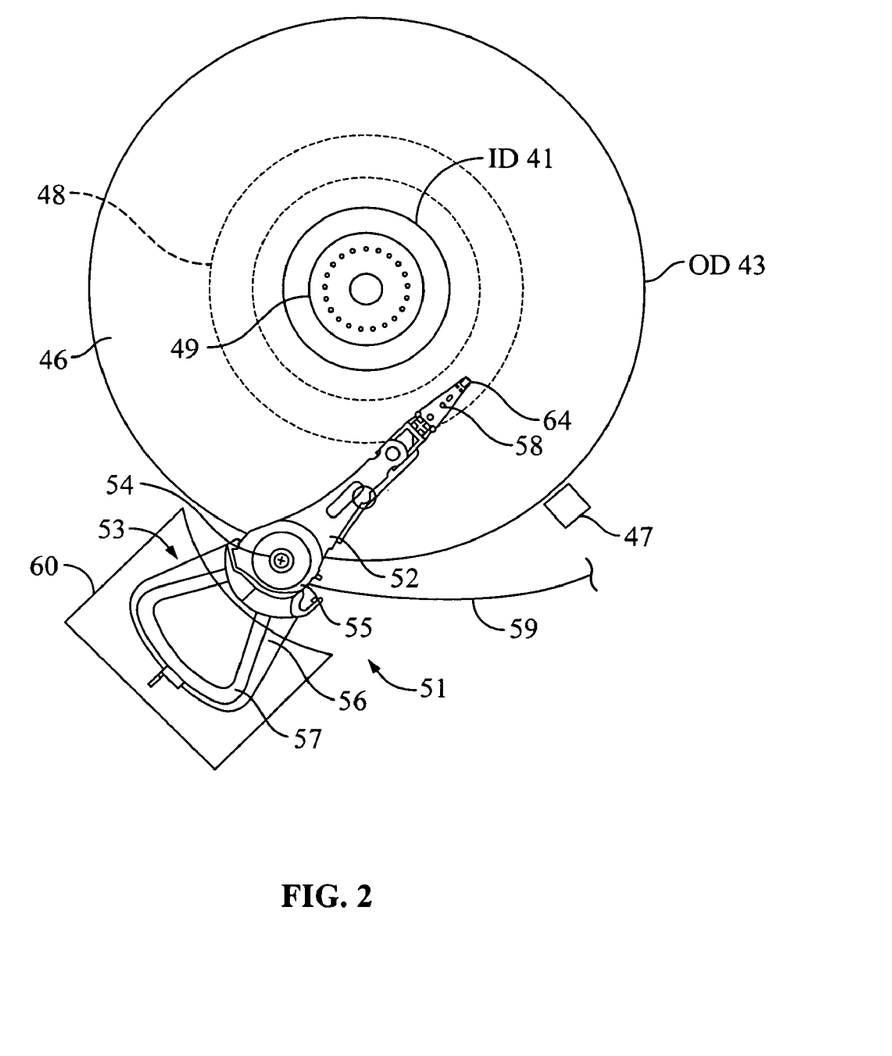
FIG. 2 is an example of an actuator having a flex circuit cable attached thereto and a disk.

With reference also to FIG. 2, FIG. 2 is an example of an actuator assembly having a flex circuit cable attached thereto and a disk. As shown in FIG. 2, a rotary actuator assembly 51 is shown relative to a disk 46 for pivoting the head 64 of the rotary actuator 51 about the disk to perform disk drive operations including read/write operations, as well as, to maintain the disk drive in an idle mode, as will be described.

As previously described, disk 46 may be mounted within the disk drive on a spindle 48 utilizing a disk clamp 49 for rapid rotation within the disk drive. The rotary actuator 51 in turn moves head 64 over the disk 46.

The rotary actuator 51 may be part of a head stack assembly (HSA) of the HDA 34. It should be appreciated that HSAs and rotary actuators are well known in the art, and this is but one example.

Looking at this particular example, rotary actuator 51 may include a head gimbal assembly (HGA) 58 to which a head 64 is mounted, a body portion 55 having a pivot bore for receipt of a pivot bearing cartridge 54, at least one actuator arm 52 cantilevered from the body portion 55, and a coil assembly 53 cantilevered from the body portion 55 in an opposite direction from the actuator arm 52. The actuator arm 52 supports HGA 58 which supports head 64 for writing and reading data to and from the disk 46, respectively. For example, the head can include an inductive head that is used to both read and write data on a recording surface of the disk 46, or a magnetoresistance (MR) head, which includes a MR head element to read data and an inductive element to write data.

Flex circuit cable 59 connects the processing circuitry of the PCBA 32 to the rotary actuator 51 of the HSA in order to deliver commands such as commands for entry into and exit out of idle mode, read and write commands, and seeking and tracking commands.

The coil assembly 53 includes a coil 57 and a fork 56. The fork 56 cantilevered from the body portion 55 in an opposite direction from the actuator arm 52 and mounts the coil 57. The rotary actuator 51 is pivotly secured to the base of the disk drive via the pivot bearing cartridge 54 mounted through the pivot bore of the body portion 55 of the rotary actuator arm 51. In this way, the head 64 at the distal arm of the HGA 58 may be moved over a surface of the disk 46. It should be appreciated that the rotary actuator 51 may include a vertical stack of HGAs supported by multiple actuator arms for use with multiple vertically stacked disks 46.

Further, as previously discussed with reference to FIG. 1, a voice coil motor (VCM) may be utilized with rotary actuator 51 in order to precisely position actuator 51 under the control of servo controller. In one example, the VCM may include one or more VCM plates 60 which include a permanent magnet. The coil 57 of the rotary actuator 51 may be disposed between the top and bottom VCM plates (only top plate 60 being shown) in order to form a voice coil motor (VCM) to cause the pivoting of the actuator 51 about the pivot axis defined by the pivot bearing cartridge 54 by inputting current into the coil 57. Thus, the VCM can be used to controllably position the head 64 of the actuator 51 relative to the disk for idle mode operations and for read/write operations. However, it should be appreciated that many other types of actuators and positioning means for the actuator may be utilized in accordance with embodiments of the invention, and this is just one example.

Looking particularly at disk 46, disk 46 includes an outer diameter (OD) 43 and an inner diameter (ID) 41. As is shown in FIG. 2, the pre-determined idle zone of tracks 48 may be located between the approximate middle diameter (MD) of the disk and the (ID) 41 of the disk. During the idle mode, processor 84 may command the application of a pre-calibrated bias signal to the actuator 51 to compensate for the bias force imparted by the flex circuit cable 59 upon the actuator 51 such that the head 64 is maintained proximate a pre-determined track of the disk within the pre-determined idle zone of tracks 48. However, it should be appreciated that the pre-determined idle zone of tracks may be defined at other locations relative to the disk. This being but one example.

A common problem associated with the use of a flex circuit cable 59 is that the flex circuit cable imparts a flex bias upon the actuator 51 and this flex bias may change dependent upon various factors, most significantly temperature. If this change in bias force is not accounted for, during an idle mode, the head 64 of the actuator 51 may be pushed toward the OD 43 and may crash against loading ramp 47 resulting in damage to the head. Conversely, if the flex bias force changes in the opposite direction, the head may be moved toward the ID 41 where it may crash against the ID crash-stop. In this instance, because there is no servo-code information underneath this area, the disk drive may take longer to go back into an active mode.

According to the embodiments of the invention, microprocessor 84 may operate under the control of a program or routine to execute methods or processes in accordance with embodiments of the invention related to responding to flex bias changes during the disk drive idle mode. More particularly, the microprocessor 84 under the control of a program or routine may execute methods or processes to recognize and compensate for flex bias changes during the disk drive idle mode. For example, such a program may be implemented in a software or firmware (e.g., stored in non-volatile memory 106 or other locations) and may be implemented by microprocessor 84.

For the purposes of the present specification, it should be appreciated that the terms "processor", "microprocessor", and "controller", etc., refer to any machine or collection of logic that is capable of executing a sequence of instructions and shall be taken to include, but not be limited to, general purpose microprocessors, special purpose microprocessors, central processing units (CPUs), digital signal processors (DSPs), application specific integrated circuits (ASICs), multi-media controllers, signal processors and microcontrollers, etc.

Components of the various embodiments of the invention may be implemented as hardware, software, firmware, microcode, or any combination thereof. When implemented in software, firmware, or microcode, the elements of the embodiments of the present invention are the program code or code segments that include instructions to perform the necessary tasks. A code segment may represent a procedure, a function, a subprogram, a program, a routine, a subroutine, a module, a software package, a class, or any combination of instructions, data structures, or program statements.

The program or code segments may be stored in a processor-readable medium or transmitted by a data signal embodied in a carrier wave, or a signal modulated by a carrier, over a transmission medium. The "processor-readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor-readable or accessible medium may include data that, when accessed by a processor or circuitry, causes the processor or circuitry to perform the operations described herein. The term "data" herein refers to any type of information that is encoded for machine-readable purposes. Therefore, it may include programs, code, data, files, etc.

As previously described, processor 84 controls operations in the disk drive including read/write operations, as well as idle mode operations. Particularly, processor 84 controls the movement of the actuator 51 and the head 64 relative to the disk 46 and is coupled to actuator 51 by the flex circuit cable 59. During the idle mode, processor 84 commands the application of a pre-calibrated bias signal to the actuator 51 to compensate for the bias force imparted by the flex circuit cable 59 upon the actuator 51 such that the head 64 is maintained proximate a pre-determined track of the disk within the pre-determined idle zone of tracks 48. Further, processor 84 determines if a back electromagnetic force (BEMF) reading associated with the actuator 51 is greater than a threshold, and if so, the processor exits the idle mode.

It should be noted that an idle mode is different from a "power-off mode." In idle mode, the disk drive 30 still has power, and head 64 basically just floats above the disk media without track following. During the idle mode, pre-amplifier 42 and the read/write channel 68 are turned off for power saving and there is no servo position information available to servo controller 98. Only a pre-determined digital-analog-conversion (DAC) current functioning as a pre-calibrated bias signal is applied to the coil 57 of the VCM of actuator 51 to maintain head 64 in a constant position against the bias force imparted by the flex circuit cable 51.

During the idle mode, a back electromagnetic force (BEMF) associated with the voice coil motor (VCM) of the actuator is continuously read by the processor 84 and stored in a BEMF register of local memory 108 or other locations. The BEMF from the coil 57 is provided as an input to servo controller 98. The BEMF value is indicative of the motion of the actuator and head and is proportional to the angular position of the head.

During the idle mode, if processor 84 determines that the BEMF reading from the BEMF register associated with the actuator is greater than a threshold value, processor 84 may command the disk drive to exit the idle mode. This BEMF reading may indicate that the head 64 is being moved out of the pre-determined idle zone of tracks 48 toward the OD 43 or ID 41 due to a change in the bias force imparted by the flex circuit cable 59 because of a temperature change or other disturbance.

When this occurs, after exiting idle mode, processor 84 may command that pre-amplifier 42 and the read/write channel 68 be powered back on such that the processor may determine the track at which the head 64 is located. If the track at which head 64 is located is outside of the pre-determined idle zone of tracks 48, processor 84 may then re-calibrate the bias signal for the flex circuit cable 59. In this way, processor 84 may re-calibrate the bias signal for the flex circuit cable 59 to account for a temperature change that the disk drive has been subjected to. Processor 84 may then re-enter the idle mode with the temperature change accounted for.

Figure 3:
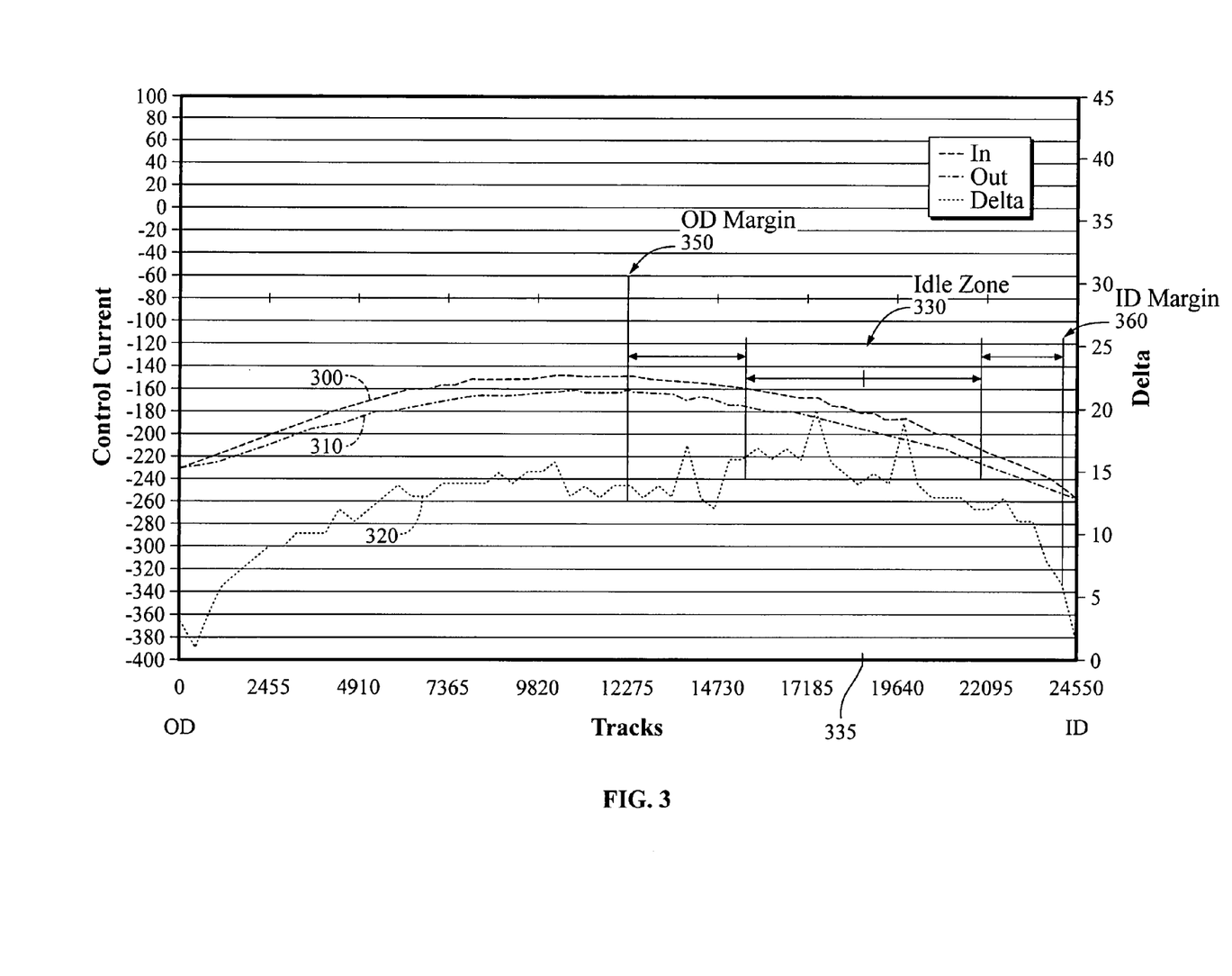
FIG. 3 is a graph that shows an example of a characterization of the bias forces associated with a flex circuit cable at a particular temperature versus the tracks of a disk.

For example, with reference to FIG. 3, FIG. 3 is a graph illustrating an example of a characterization of the bias forces associated with a flex circuit cable at a particular temperature versus the tracks of a disk. The y-axis represents a control current (e.g., DAC current in milliamps) that is used to compensate for the bias force of the flex circuit cable and the x-axis represents the position of the head relative to the tracks (e.g., OD at track 0 and ID at approximately 24550).

More particularly, line 300 represents the control current to compensate for the bias force of a flex circuit cable versus track ID going from ID to OD and line 310 represents the control current to compensate for the bias force going from OD to ID. Line 320 represents the delta of the ID to OD and OD to ID characterizations.

In this example, a pre-determined idle zone of tracks 330 is shown located between the MD of the disk and the ID of the disk, such that in the idle mode the head is maintained proximate to a pre-determined track 335 within the pre-determined idle zone of tracks 330.

Further, as can be seen in FIG. 3, there is an OD margin 350, at which, if the head of the actuator passes the OD margin 350, the head will accelerate with the increasing bias force along the OD direction and will hit the loading ramp with a relatively great deal of force resulting in potential damage to the head and a head-land-on-media failure. Also, as shown in FIG. 3, an ID margin is present, wherein, if the head passes the ID margin zone 360, the head will move toward the inner diameter and hit the crash-stop.

Figure 4:
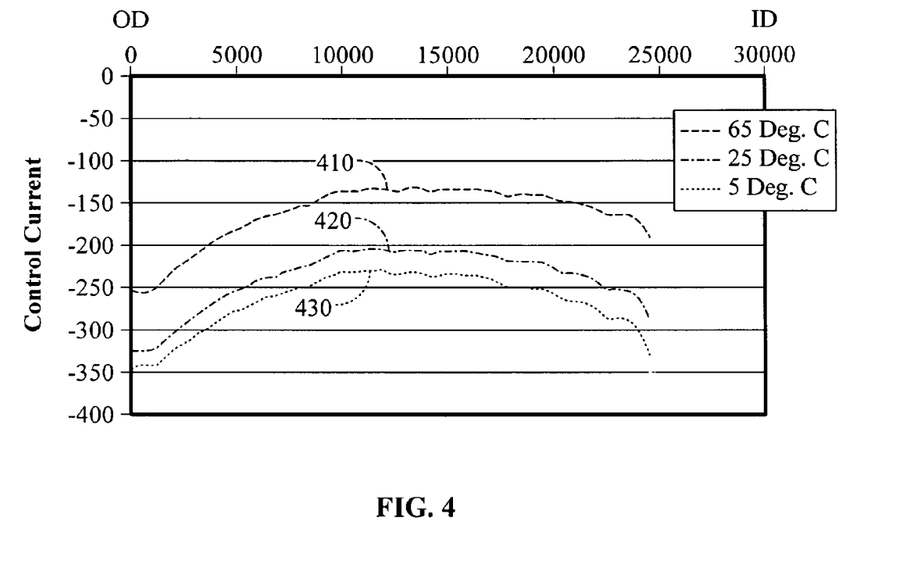
FIG. 4 is a graph that shows an example of a characterization of the bias forces associated with a flex circuit cable at different temperatures versus the tracks of a disk.

As has been recognized by Applicants, the bias force imparted by the flex circuit cable upon the actuator is very temperature dependent. For example, a graph of the control current required to compensate for a bias force imparted by the flex circuit cable across the tracks of the disk drive from OD to ID for different temperatures is illustrated in FIG. 4. In FIG. 4, the y-axis represents the control current (e.g., DAC current in milliamps) that is required to compensate for the bias force imparted by the flex circuit cable across the tracks of the disk from OD to ID as represented by the x-axis.

As can be seen in FIG. 4, for a higher temperature (e.g., 65° Celsius), line 410 shows that less of a control current is needed to compensate for the flex bias force than lower temperatures represented by lines 420 and 430, illustrating the control currents required at 25° Celsius and 5° Celsius, respectively. As can be appreciated by this graph, when a disk drive is exposed to lower temperatures the flex circuit cable will impart a force upon the actuator and the head, moving the head toward the OD, which may result in the head hitting the loading ramp and potentially damaging the head of the disk drive.

Figure 5A:
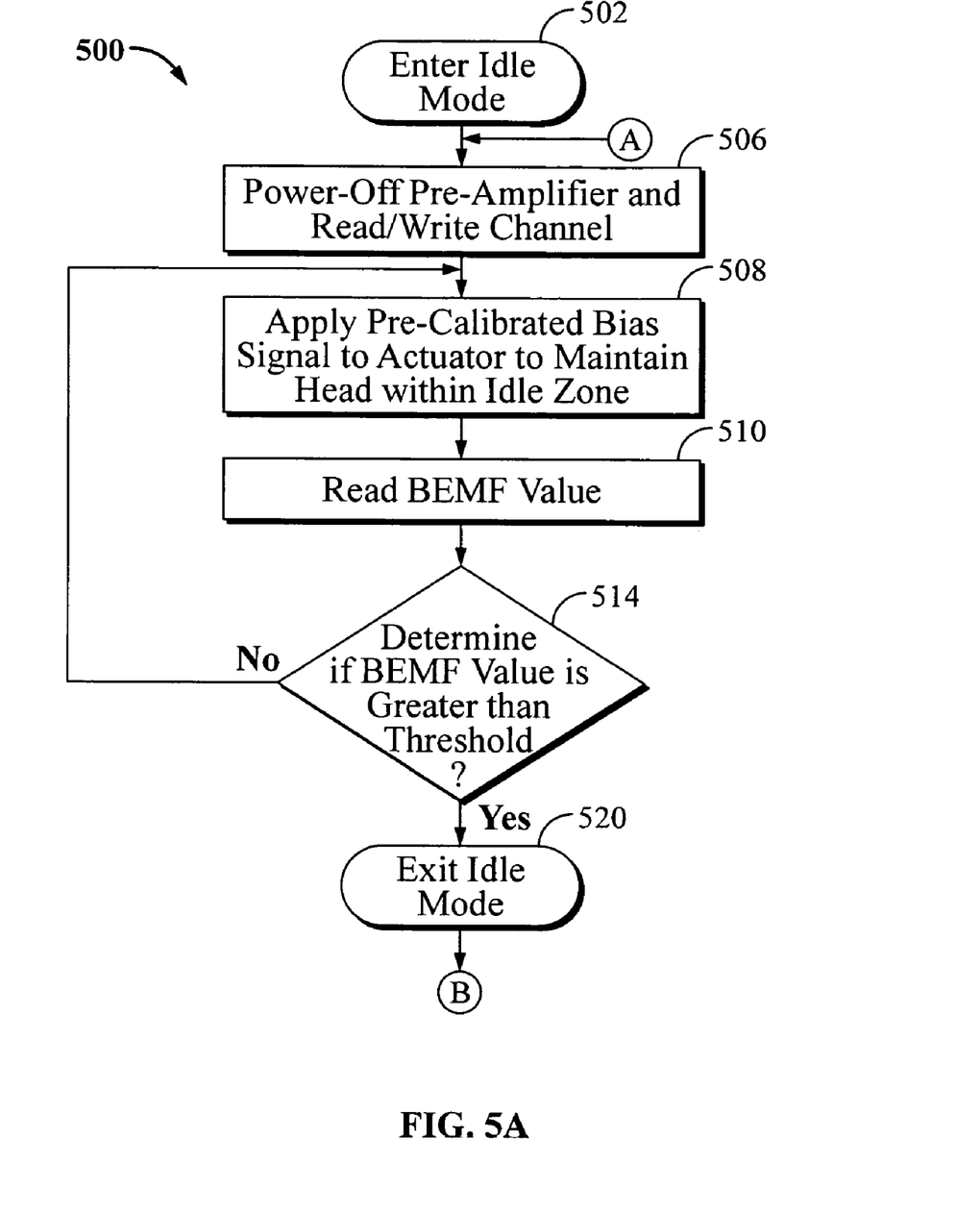
FIGS. 5A and 5B show a flow diagram that illustrates a process to compensate for flex bias changes of the flex circuit cable in an idle mode.
Figure 5B:
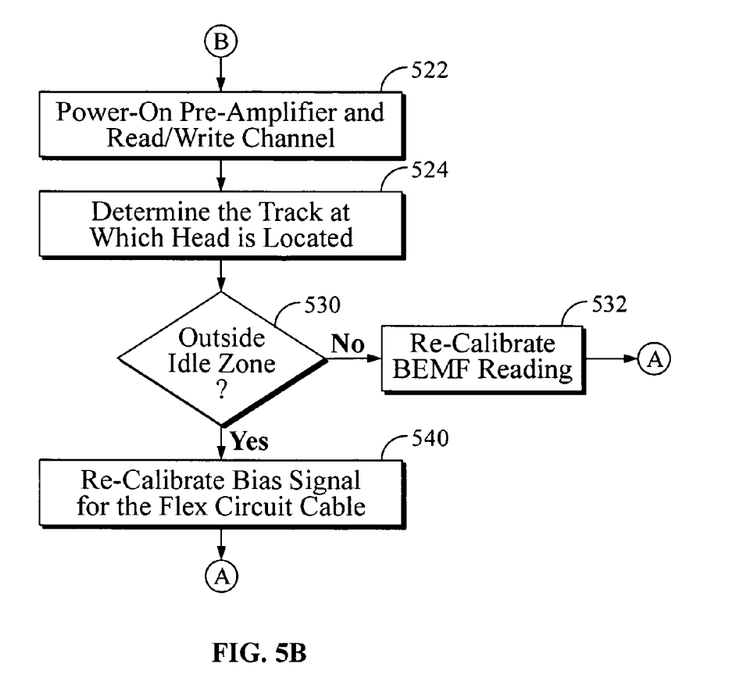

Turning now to FIGS. 5A and 5B, FIGS. 5A and 5B show a flow diagram that illustrates a process 500 to compensate for flex bias changes of the flex circuit cable in an idle mode. As shown at block 502, firstly, the processor commands the disk drive to enter into an idle mode. Upon entering into the idle mode, the pre-amplifier is powered off, the read/write channel is powered off, and other suitable components may be powered off in order to minimize power consumption (block 506).

At block 508, the processor commands the application of a pre-calibrated bias signal to the actuator to maintain the head within the idle zone. Particularly, as previously discussed, the head is maintained proximate to a pre-determined track of the disk within a pre-determined idle zone of tracks. Next, at block 510, the processor reads the BEMF value associated with the actuator and at decision block 514 determines if the BEMF value is greater than a pre-determined threshold value. If not, the processor continues to apply the pre-calibrated bias signal to the actuator to maintain the head within the idle zone.

However, if it is determined that the BEMF value is greater than the threshold, then the processor commands the exiting of the disk drive out of the idle mode (block 520). At this point, the processor commands the powering-on of the pre-amplifier, the read/write channel, and other suitable components, to exit out of the idle mode (block 522). Next, the processor determines at which track the head is located (block 524).

At decision block 530, if the processor determines that the track at which the head is located is outside of the pre-determined idle zone of tracks, the processor then re-calibrates the bias signal for the flex circuit cable (block 540). Process 500 then returns to point A of the idle mode. In this way, the re-calibrated bias signal will account for the increased bias in the flex circuit cable such that the head will be maintained within the proper idle-zone of tracks.

However, if the head is determined not to be outside of the pre-determined zone of tracks then the BEMF reading is re-calibrated (block 532) and the process then re-enters the idle mode at point A.

Utilizing the above-described process 500, head movement is monitored for during the idle mode utilizing VCM and BEMF information. Particularly, when it is determined that the head has moved out of the idle zone, the idle mode can be exited out of. The bias signal for the flex circuit cable can then be re-calibrated and applied to ensure that the head stays within the idle zone and the head does not accelerate toward the ramp at the OD or the crash-stop at the ID. This eliminates the very serious problem of the head hitting the ramp at the OD, which can result in head failure and potential failure of the disk drive.

This provides an elegant solution in that the BEMF value from the BEMF register is available to provide position and velocity information. A threshold value may be set for a suitable BEMF value based on mechanical parameter distributions and signal to noise ratio to indicate that the head has moved significantly enough to warrant exiting out of the idle mode.

As previously described, once the BEMF reading exceeds the threshold, the pre-amplifier and the read/write channel are activated to confirm the motion of the head by reading the servo-code track identifiers associated with the disk media. If the head has moved out of the pre-determined idle zone of tracks, then the flex bias is assumed changed and re-calibration is employed. Alternatively, if there has been a false alarm, and the head actually still remains within the pre-determined idle zone of tracks, this implies that the BEMF reading may be inaccurate and needs to be re-calibrated, which is accomplished by the above-described process 500. Thus, another benefit of the process is to check the accuracy of the BEMF reading. With a more accurate BEMF reading, better velocity control determinations can be made during load and unload operations and increased smoothness can be obtained during seek operations. The above-described process 500 provides an elegant solution to account for flex bias changes in the flex circuit cable based on numerous factors, including the most prevalent, changes in temperature.

Figure 6:
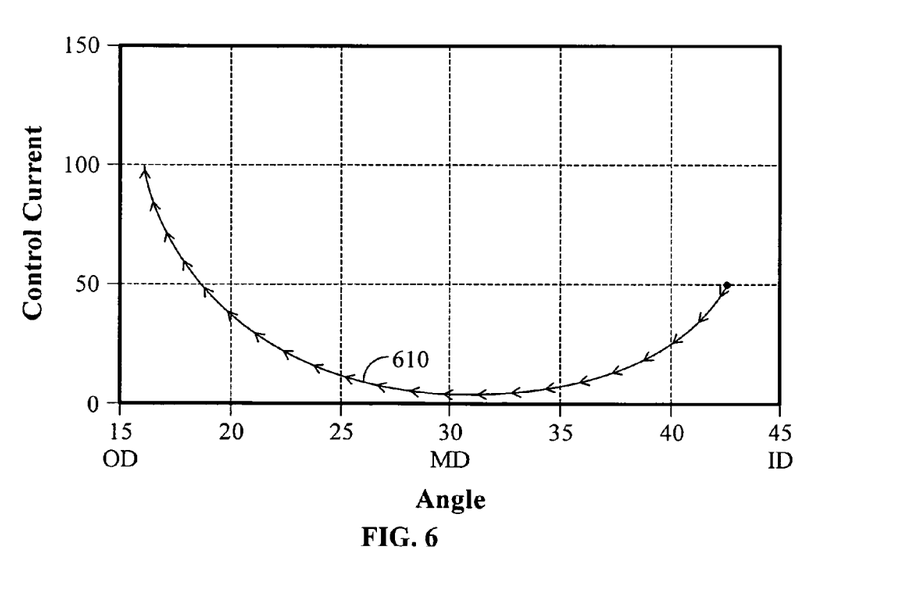
FIG. 6 is a graph showing an example of a re-calibrated bias signal that is utilized to keep the head from drifting toward the outer diameter (OD) in response to a temperature change of the disk drive.

Turning now to FIG. 6, FIG. 6 is a graph showing an example of a re-calibrated bias signal 630 that is utilized to keep the head from drifting toward the outer diameter (OD) in response to a temperature change of the disk drive.

The y-axis represents the bias holding control current (e.g., DAC current in milliamps) and the x-axis represents the angle of the head relative to the disk in terms of OD to ID. For example, with a brief reference FIG. 4, assuming that there is a drastic temperature change such as from 60° Celsius (line 410) to 5° Celsius (line 430), the flex bias associated with the flex bias circuit will be changed and the above-described process 500 will automatically re-calibrate a bias signal to compensate for it.

As can be seen in FIG. 6, with this drastic temperature change, the flex bias of the flex circuit cable will tend to move the head toward the OD as indicated by the arrows on line 610. As shown along line 610, the head will drift towards the MD due to the increasing bias force due caused by the temperature change. In fact, after passing the MD, the head will start to accelerate due to the fact that the flex bias force keeps building up along the OD direction.

However, as previously described, the above-process 500 will determine that a read BEMF value is determined to be greater than a threshold value and that the head has begun to move outside of the idle zone. The process 500 will then re-calibrate the bias signal and will apply the re-calibrated bias signal such that the head will be pushed back and maintained in the pre-determined idle zone and the increased flex bias due to the temperature change upon the flex circuit cable will be accounted for.

It should be appreciated by those with skill in this art that, that although embodiments of the invention have been previously described with reference to particular disk drive components, the embodiments of the invention may be utilized in a wide variety of differing types of storage devices, and that the details disclosed in describing the embodiments of the invention are not intended to limit the scope of the invention as set forth in the appended claims.

We claim:

1. A disk drive comprising:
    an actuator including a head;
    a disk having a plurality of tracks; and
    a processor to control the movement of the actuator and the head relative to the disk, the processor being coupled to the actuator by a flex circuit cable, the processor to:
    command the application of a pre-calibrated bias signal to the actuator during an idle mode to compensate for a bias force imparted by the flex circuit cable upon the actuator such that the head is maintained proximate a pre-determined track of the disk within a pre-determined idle zone of tracks; and
    determine if a back electromagnetic force (BEMF) reading associated with the actuator is greater than a threshold value, and if so, exiting the idle mode.

2. The disk drive of claim 1, further comprising a pre-amplifier to provide power to the head, wherein entering the idle mode includes powering-off the pre-amplifier.

3. The disk drive of claim 1, further comprising a pre-amplifier to provide power to the head, wherein exiting the idle mode includes powering-on the pre-amplifier.

4. The disk drive of claim 1, wherein, after exiting the idle mode, the processor determines the track at which the head is located.

5. The disk drive of claim 4, wherein if the track at which the head is located is outside of the pre-determined idle zone of tracks, the processor re-calibrates the bias signal for the flex circuit cable.

6. The disk drive of claim 5, wherein the processor re-calibrates the bias signal for the flex circuit cable to account for temperature changes associated with the flex circuit cable.

7. The disk drive of claim 5, wherein the processor re-enters the idle mode.

8. The disk drive of claim 4, wherein if the track at which the head is located is within the pre-determined idle zone of tracks, the BEMF reading is re-calibrated.

9. The disk drive of claim 8, wherein the processor re-enters the idle mode.

10. The disk drive of claim 1, wherein the pre-determined idle zone of tracks is located between a middle diameter (MD) of the disk and an inner diameter (ID) of the disk.

11. In a disk drive including a disk having a plurality of tracks and an actuator including a head, the actuator being coupled to circuitry of the disk drive by a flex circuit cable, a method to adaptively adjust for flex bias change in the flex circuit cable comprising:
    applying a pre-calibrated bias signal to the actuator during an idle mode to compensate for a bias force imparted by the flex circuit cable upon the actuator such that the head is maintained proximate a pre-determined track of the disk within a pre-determined idle zone of tracks; and
    determining if a back electromagnetic force (BEMF) reading associated with the actuator is greater than a threshold value, and if so, exiting the idle mode.

12. The method of claim 11, wherein entering the idle mode comprises powering-off a pre-amplifier that provides power to the head.

13. The method of claim 11, wherein exiting the idle mode comprises powering-on a pre-amplifier that provides power to the head.

14. The method of claim 11, further comprising, after exiting the idle mode, determining the track at which the head is located.

15. The method of claim 14, further comprising, determining if the track at which the head is located is outside of the pre-determined idle zone of tracks, and if so, re-calibrating the bias signal for the flex circuit cable.

16. The method claim 15, wherein the bias signal for the flex circuit cable is re-calibrated to account for temperature changes associated with the flex circuit cable.

17. The method of claim 15, further comprising, re-entering the idle mode.

18. The method of claim 14, further comprising, determining if the track at which the head is located is within the pre-determined idle zone of tracks, and if so, re-calibrating the BEMF reading.

19. The method of claim 18, further comprising, re-entering the idle mode.

20. The method of claim 11, wherein the pre-determined idle zone of tracks is located between a middle diameter (MD) of the disk and an inner diameter (ID) of the disk.

* * * * *